United States Patent [19]

Thomas et al.

[11] Patent Number: 5,702,841
[45] Date of Patent: Dec. 30, 1997

[54] ELECTROLYTE VENTING SYSTEM WITH TUBULAR SPLASH GUARDS

[75] Inventors: Brian J. Thomas, Pewaukee; Gerald D. Slayton, Milwaukee; Jerome R. Heiman, Campbellsport; Rick Barnett, Milwaukee, all of Wis.

[73] Assignee: Globe-Union Inc., Milwaukee, Wis.

[21] Appl. No.: 504,073

[22] Filed: Jul. 19, 1995

[51] Int. Cl.$^6$ .............................. H01M 2/04; H01M 2/12
[52] U.S. Cl. .......................... 429/88; 429/84; 429/87; 429/175
[58] Field of Search .................... 429/82, 84, 87, 429/88, 89, 175

[56] References Cited

U.S. PATENT DOCUMENTS

| | | | |
|---|---|---|---|
| 3,508,972 | 4/1970 | Goldingay | 429/79 |
| 3,597,280 | 8/1971 | Hennen | 429/88 |
| 3,879,227 | 4/1975 | Henne | 429/86 |
| 3,915,753 | 10/1975 | Melone | 429/91 |
| 3,944,437 | 3/1976 | Auerback | 429/82 |
| 4,086,395 | 4/1978 | Heiser et al. | 429/88 |
| 4,233,370 | 11/1980 | Heiser et al. | 429/82 |
| 4,278,742 | 7/1981 | Oxenreider et al. | 429/88 |
| 4,306,002 | 12/1981 | Heiser et al. | 429/84 |
| 4,338,383 | 7/1982 | Jutte et al. | 429/88 |
| 4,348,466 | 9/1982 | Elehew et al. | 429/84 |
| 4,409,302 | 10/1983 | Poe | 429/88 |
| 4,460,661 | 7/1984 | Sköld | 429/89 |
| 4,778,735 | 10/1988 | Shestok et al. | 429/82 |
| 4,916,034 | 4/1990 | Huselbus et al. | 429/86 |
| 5,284,720 | 2/1994 | Theurk et al. | 429/87 |
| 5,380,604 | 1/1995 | Hampe et al. | 429/84 |

*Primary Examiner*—Kathryn L. Gorgos
*Assistant Examiner*—William T. Leader
*Attorney, Agent, or Firm*—Harness, Dickey & Pierce, P.L.C.

[57] ABSTRACT

A battery cover for a battery casing has a plurality of electrolyte containing cells, a primary cover and a secondary cover. The primary cover has a plurality of barrels arranged along a longitudinal axis and the secondary cover has a plurality of tubular elements extending downwardly and insertable in the barrels of the primary cover. Each of the tubular elements has an inner tubular member and an outer tubular member. The outer tubular member has an axially extending cutout portion which runs from its tip to the surface of the secondary cover. The battery cover also has a plurality of baffles defining a circuitous passageway for gases which are evolved in the cells of the battery to be released to an external port located on the secondary cover.

14 Claims, 5 Drawing Sheets

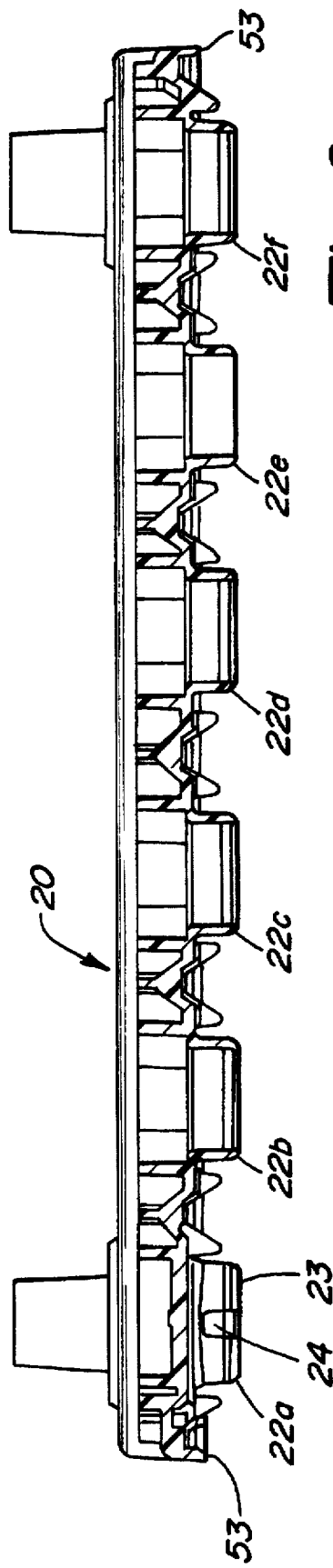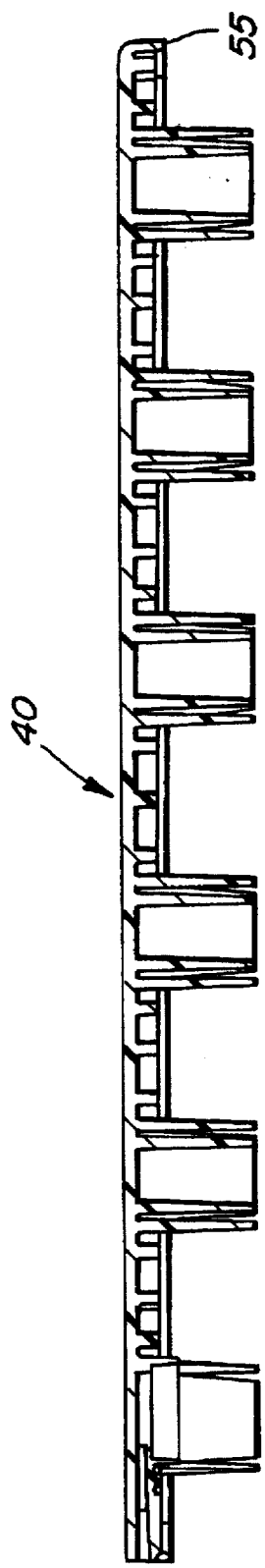

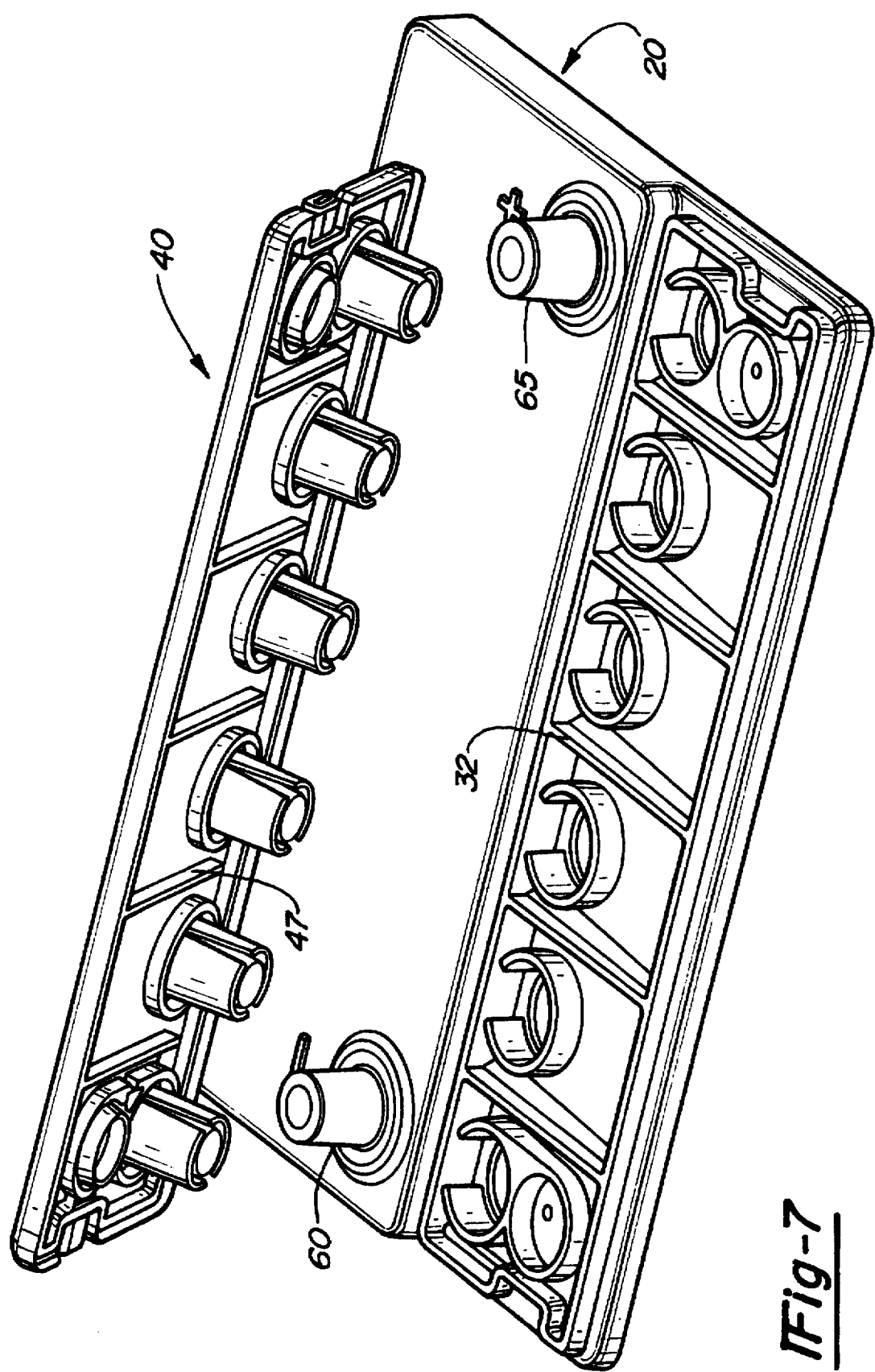

5,702,841

ELECTROLYTE VENTING SYSTEM WITH TUBULAR SPLASH GUARDS

BACKGROUND OF THE INVENTION

1. Field of the Invention

The present invention relates generally to the art of electric storage batteries, for example automotive and truck batteries. More particularly, the invention relates to venting systems for such batteries which provide a flow path for the escape of hydrogen and oxygen formed during the electrochemical reactions which take place in such batteries, while providing resistance to acid spewing. Still more specifically, the invention relates to a cover design which retains electrolyte within the cells of the batteries so that it will not become entrained in the flow of gases escaping through the flow path of the venting system.

2. Background of the Invention

Conventional lead-acid batteries, such as those used for automobiles and trucks, generally include a number of cells disposed in a battery housing. Each cell typically includes a plurality of positive and negative battery plates or electrodes, and separators are sandwiched between the plates to prevent shorting and undesirable electron flow during the reactions which take place during manufacture and use of the batteries. The plates and separators are immersed in electrolyte disposed in the cells, the most common type of electrolyte being aqueous sulfuric acid and infrequently the electrolyte is in the form of a gel. The positive plate generally is constructed of a lead-alloy grid covered with lead oxide, while the negative plate generally contains lead as the active material, again covering a lead alloy grid.

In most battery constructions the battery housing includes a box-like base to contain the cells and which is made from a moldable resin. The housing is generally rectangular in horizontal cross-section, the cells being provided by vertical partitions within the housing. A cover is provided for the casing, the cover including terminal bushings and a series of filler holes to allow electrolyte to be added to the cells and to permit whatever servicing is required. To prevent undesirable spillage of electrolyte from the fill holes, most prior art batteries have included some sort of filler hole cap.

The electromotive potential of each battery cell is determined by the chemical composition of the electroactive substrates employed for the electrochemical reactions. For lead-acid batteries, such as those described above, the potential is usually about two volts per cell, regardless of cell volume. Vehicles manufactured by original equipment manufacturers (OEM's) typically require twelve volt batteries, so most of today's batteries include six cells (6 cells×2 volts per cell=12 volts). The size of the housing for the battery is selected for the "envelope" for a particular vehicle, i.e. the physical dimensions defined by the vehicle manufacturer for containment of the battery in the engine compartment.

Battery electrolyte spillage or spewing can be caused by a number of factors, including vibration or tilting as a vehicle maneuvers during normal use. Electrolyte escape may also be caused by battery overheating, a problem especially pronounced in recent years with smaller engines, which tend to run hotter than prior engines.

In addition to preventing spillage or spewing of electrolyte from the cells, the battery cover design and the filler caps need to perform an important and different function. This is because gases are liberated from lead-acid batteries during the charge and discharge reactions. Such reactions start at the time the battery is originally charged (called the "formation process") by the manufacturer or by the retailer or vehicle manufacturer. They also occur during normal operation of the battery. Factors such as high current charge and discharge conditions, and changes in temperature, can affect the rate at which gas evolution occurs. Control of gas generation and evolution in lead-acid battery construction is particularly important, because the gases are hydrogen and oxygen, and it is important to vent such gases in a controlled way from the battery to prevent pressure buildups in the housing which could lead to electrolyte leaks, housing failures, or most significantly explosions within the housing. It is also desirable, and well known, to prevent an external flame from entering the battery through gas exhaust ports.

The control for releasing gases from the electrolyte cells has often been accomplished by providing gas release slots on the primary cover in addition to the barrel openings. One drawback for providing such gas release slots is that during the formation process, the gas release slots become an additional passageway through which electrolytes escape. As a result, during the formation process, these gas release slots need to be blocked off in addition to the barrel openings.

Two of the problems previously mentioned, i.e. electrolyte spewing and gas evolution, are really interrelated and important in the construction of an effective cover and vent system. For example, electrolyte may enter the vent cap through several mechanisms. One mechanism is through vibrational or tilting flow of electrolyte into the cap, and another is through a mechanism frequently referred to as pumping. The latter occurs when gas evolved in the battery bubbles from the cells and carries or forces electrolyte out the fill hole and into the cap. When electrolyte enters the caps of some prior designs it may be carried out the exhaust passageway and cause damage to external battery components, such as the battery terminals or adjacent engine components.

One method to minimize the entrance of electrolyte into the flow path of the evolved gases is the use of splash guards. The splash guards come in various shapes and sizes and are located at different points of the battery vent cap, but the objective of the splash guard has remained the same, to optimize the release of the evolved gases while containing the entrance of electrolyte into the flow path of the evolved gases.

In Poe, U.S. Pat. No. 4,409,302, issued Oct. 1, 1983, a "Venting System for an Electric Storage Battery" including an electrolyte trapping chamber having a floor sloping toward a drainage aperture is disclosed. In this system, a tubular portion depending from a cover extends into the drainage aperture for preventing electrolyte splash from entering the trapping chamber.

In U.S. Pat. No. 4,778,735 to Shestok et al. entitled "Storage Battery Gang Vent Cap," a gang vent cap having a splash guard in the shape of an inverted cone is disclosed. This device also provides a tubular member depending from a cover and disposed above each electrolyte cell port to trap and condense battery acid contained in the gases venting from the battery cell.

Another type of splash guards used in battery vent caps is described in commonly owned U.S. Pat. No. 4,916,034, issued Apr. 10, 1990 to Hulsebus, et al. and entitled "Battery Vent Strip." In this device, a manifold strip and a top are provided for encasing the electrolyte ports of the battery. Splash shields are formed underneath the top in the shape of a downwardly extending split cylinder. The splash shields are provided for and circumscribe the outermost and innermost ports of the battery to reduce electrolyte leakage into the exhaust flow path.

Thuerk et al., in U.S. Pat. No. 5,284,720 entitled "Vent Cap with Electrolyte Drain and Explosion Attenuation Capabilities," disclose tubular splash guards which extend downwardly from the upper cover of the vent cap. The tubular splash guards have open bottoms and are arranged to be coaxial with but spaced slightly above the barrels of the lower cover of the vent cap. These guards act to reduce electrolyte entry into the interior of the vent cap while permitting unobstructed flow paths from the barrels to the interior of the vent cap.

While a number of different solutions have been proposed in the aforementioned patents to the technical problems discussed earlier in this section of the specification, optimization has still not been achieved.

An improved vent cap and cover construction for minimizing the possibility of electrolyte leakage from the battery and efficiently directing gases from the battery would represent a substantial advance in this art.

SUMMARY OF THE INVENTION

An object of this invention is to provide an improved electrolyte venting system for use in connection with storage batteries.

Another object of this invention is to provide an improved electrolyte venting system having coaxial tubular splash guards capable of efficiently ventilating gases from the battery cells while containing escaping electrolytes within the battery cells.

Still another object of this invention is to provide an improved electrolyte venting system having a unique arrangement of baffles in combination with coaxial tubular splash guards so that gases may be efficiently vented from the battery cells while electrolytes are contained within the battery cells.

Still another object of this invention is to provide a primary and a secondary cover which does not require additional gas release slots on the primary cover for releasing gases from the electrolyte cells because of the optimized performance of the coaxial tubular splash guards.

The above and other objects of the invention are accomplished with a battery cover for a battery casing having a plurality of electrolyte containing cells, a primary cover and a secondary cover. The primary cover has a plurality of barrels arranged along a longitudinal axis and the secondary cover has a plurality of tubular elements extending downwardly from a surface thereof. The tubular elements are insertable in the barrels of the primary cover.

Each tubular element has coaxially arranged inner and outer tubular members. The outer tubular member has an axially extending cutout portion which runs from its tip to the surface of the secondary cover. Both of the coaxially arranged tubular members suppress splashing of the electrolyte. Slots formed on the outer tubular member permit gases to be released therethrough.

The primary cover has a c-shaped ridge surrounding each of its barrels and the secondary cover has an o-shaped ridge corresponding to each of the c-shaped ridges so that when the secondary cover is mounted atop the primary cover, gaseous communication is possible only through the open section of the c-shaped ridges. Additional ridges are provided on both covers such that they partition the barrels from each other and form a plurality of sealed rectangular-shaped compartments. The additional ridges of the secondary cover have cutouts formed adjacent to a short side of the rectangular-shaped compartments so that gases may escape through these cutouts.

The open sections of the c-shaped ridges formed on the primary cover are located adjacent to and facing this short side. The side opposite to this short side is inclined with respect to this short side so that if electrolyte is splashed into the compartment, the electrolyte will have a tendency to flow back toward this short side, into the open section of the c-shaped ridges and ultimately into the electrolyte cell.

The battery cover also includes an external port in gaseous communication with the barrels of said primary cover. The external port is formed horizontally on opposite ends of the secondary cover. This port is in gaseous communication with a cylindrical conduit which is formed on the secondary cover adjacent to this port. Surrounding the cylindrical conduit and also formed on the secondary cover is a partially open circular ridge.

Corresponding to the partially open circular ridge is a circular ridge formed on the primary cover. Within the circular ridge a cylindrical receptacle for receiving the cylindrical conduit of the secondary cover is provided. The cylindrical receptacle has a projecting surface on a bottom surface of the receptacle and a porous plate is received in said receptacle atop the projecting surface. When the secondary cover is mounted atop the primary cover, the ridges seal gaseous communication except through the partially open section in the circular ridge of the secondary cover, so that the evolved gases reach the port only after they have passed through the opening of the partially open circular ridge, the receptacle of the primary cover, the porous plate, and the cylindrical conduit.

Additional objects and advantages of the invention will be set forth in the description which follows. The objects and advantages of the invention may be realized and obtained by means of the instrumentalities and combinations particularly pointed out in the appended claims.

BRIEF DESCRIPTION OF THE DRAWINGS

In the various FIGURES, like reference numerals are used to indicate like components.

The invention is described in detail herein with reference to the drawings in which:

FIG. 2 is a sectional view of the primary cover taken along line 2—2 of FIG. 1.

FIG. 3 is a sectional view of the secondary cover taken along line 3—3 of FIG. 1.

FIG. 7 is a perspective view of a primary cover and a secondary cover according to the second embodiment of the present invention.

DETAILED DESCRIPTION OF THE SPECIFIC EMBODIMENTS

Before proceeding to the detailed description of the preferred embodiment, several general comments are warranted with regard to the applicability and the scope of the present invention.

First, the present invention is illustrated in connection with a centerline vent battery, in which the vents are aligned along the center axis of the battery, and a centerline post battery, in which the electrodes (or posts as they are commonly called) are aligned along the center axis of the battery. These two configurations are commonly used at the present time in connection with automotive and truck batteries. However, the principles of the invention could readily be adapted to other configurations.

Second, the present invention is illustrated in connection with a six-cell battery having six filler holes and wherein the holes are capped by six barrels formed on a primary cover. The invention could easily be adapted to batteries having a different number of cells, such as 4 or 8 cells.

In the following discussion of the present invention applied to the six-cell battery, the six cells and their corresponding structure are identified with suffixes a–f. Elements which correspond to any of the six cells are labeled as "NNx," where "NN" is the number identifying the structural element and "x" is the letter identifying the associated cell. When only "NN" is referenced, it is intended that the discussion of the element "NN" applies generically to all other like elements.

Figure 1:
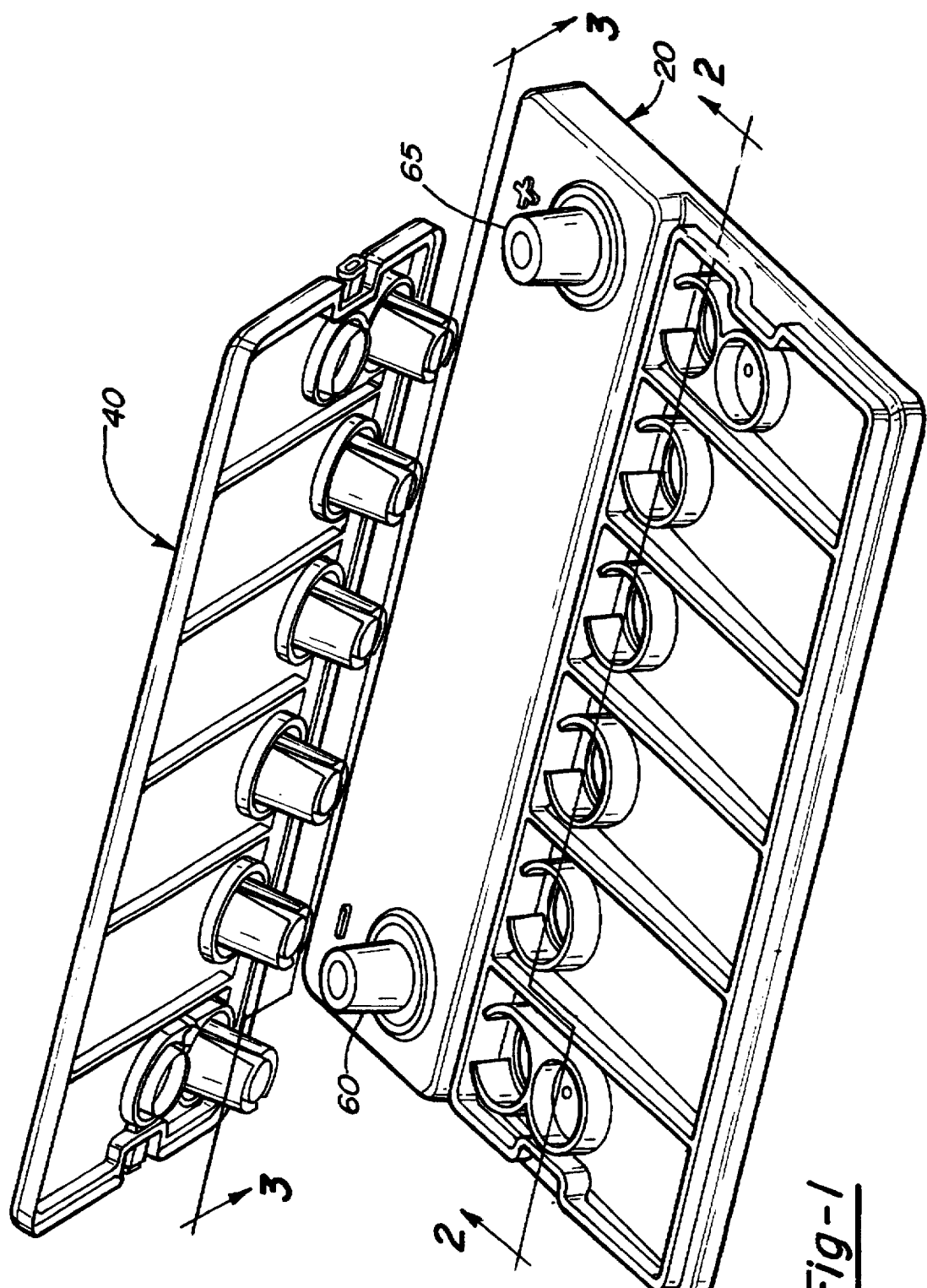
FIG. 1 is a perspective view of a primary cover and a secondary cover according to the preferred embodiment of the present invention.

Proceeding now to a description of the first and the preferred embodiment of the present invention, the perspective view of a primary cover 20 and a secondary cover 40 are illustrated in FIG. 1. The primary cover 20 is adapted to fit over a conventional battery casing (not shown) of the type which includes six cells containing battery plates, separators and electrolyte. In the illustrated, rectangular configuration, the primary cover 20 includes a negative terminal post 60 and a positive terminal post 65. The two covers 20, 40 are typically made from the same type of material used for conventional batteries and battery casings, namely polyethylene or polypropylene materials which are able to withstand the harsh environment of lead-acid batteries.

Figure 5:
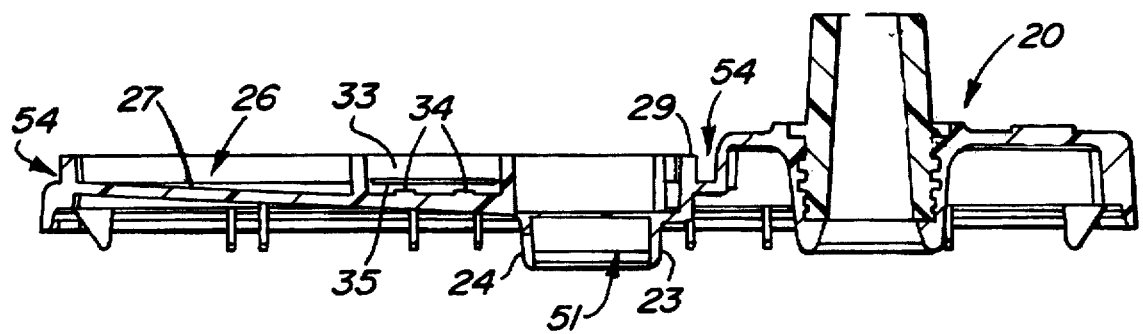
FIG. 5 is a sectional view of the primary cover taken along line 5—5 of FIG. 4.
Figure 6:
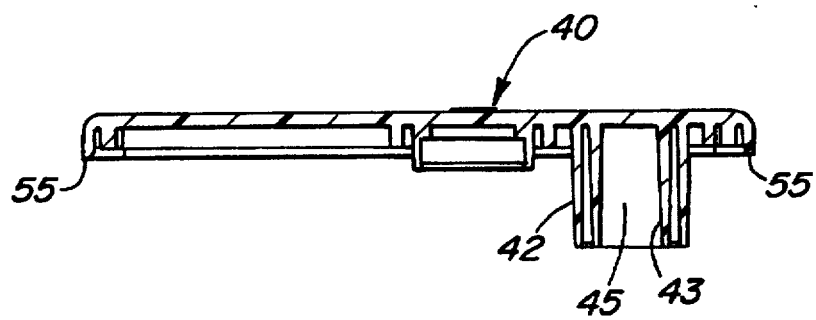
FIG. 6 is a sectional view of the secondary cover taken along line 6—6 of FIG. 4.

As shown best in FIG. 2, a lip 53 is provided around the edge of the primary cover 20 to allow it to be attached to the battery casing in a conventional manner, which includes sealing the two components through adhesives, heated platens, ultrasonic welding, and other techniques known in the art for joining such materials. Likewise, a lip 55 is provided around the edge of the secondary cover 40 to allow it to be attached to the primary cover 20 in a similar conventional manner. As best seen in FIG. 5 and 6, the lip 55 of the secondary cover 40 is inserted into recessed grooves 54 provided on the primary cover 20.

The attachment of the terminals to the electrodes of the battery cells located beneath the primary cover 20 will not be explained in detail, as those components, in and of themselves, are not part of the present invention. It will be understood, however, that the negative plates of the cell located beneath negative terminal post 60 will be coupled electrically to that terminal post, while the positive plates of the cell located beneath positive terminal post 65 will be similarly coupled to that terminal post.

Figure 4:
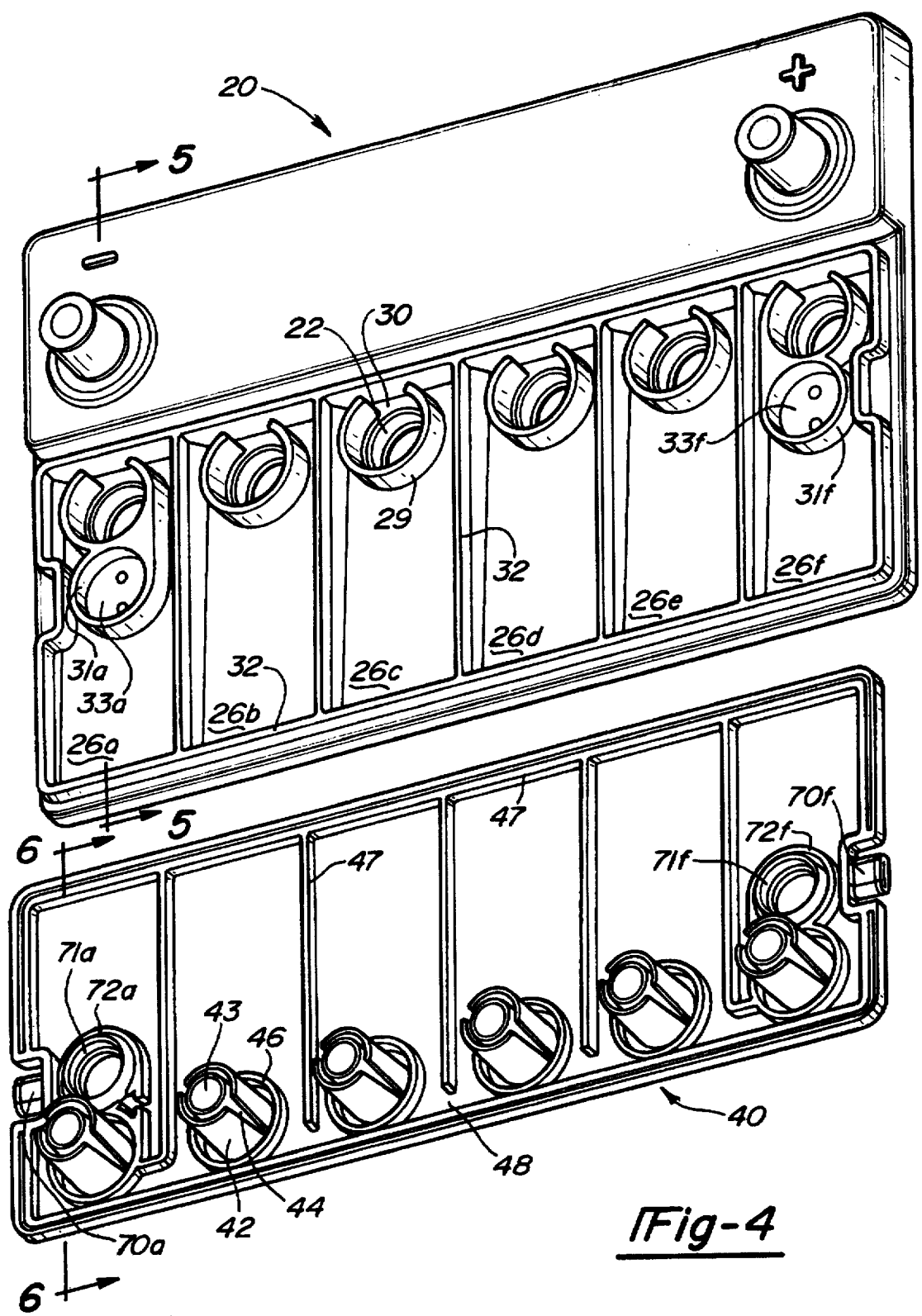
FIG. 4 is a top perspective view of the primary cover and a bottom perspective view of the secondary cover according to the preferred embodiment of the present invention.

Primary cover 20 includes six splash barrels, numbered 22a, 22b, 22c, 22d, 22e and 22f (see FIG. 2), and arranged in a linear, spaced-apart relationship, as illustrated best in FIG. 4. The barrels 22a–f extend downwardly from the surface of the primary cover 20 and are positioned for alignment with the respective cells of the battery when the primary cover 20 is attached to the battery casing.

FIG. 2 is a sectional view of the primary cover taken along line 2—2 of FIG. 1 and shows barrels 22a–f. The view of barrel 22a is a plan view, whereas views of barrels 22b–f are sectional views. The structure of the barrels 22a–f is identical and a discussion of one barrel applies equally to the other five barrels. As shown in FIG. 2, each barrel 22 has a generally cylindrical tubular portion 23 which extend downward into the fill hole of its respective cell.

At the bottom tip of the barrel 22, on a side away from the posts 60, 65, a generally rectangular cutout 24 is provided. The cutout 24 is provided to allow electrolyte to flow more easily into the cells of the battery when the battery is initially filled with electrolyte. The cutout 24 is positioned on a side of the barrel away from the posts 60, 65, because electrolyte filling is usually conducted with the battery tilted with the posts 60, 65 higher with respect to the barrels 22a–f.

The primary cover 20 provides a plurality of baffles which tend to isolate electrolytes which escape from the cells of the battery through the barrels 22a–f. One set of such baffles defines the walls 32 which isolate the primary cover 20 six sectors 26a–f. Each sector 26 has a generally rectangular shape and a lower surface 27 (labeled in FIG. 5) which is inclined. FIGS. 4 and 5 show the incline of the lower surface 27 to be increasing in a direction away from the centerline of the battery. The inclined lower surface 27 allows the electrolyte which has escaped into the sector 26 to drain into the barrel 22 by the force of gravity.

Another set of baffles is a set of c-shaped ridges 29a–f (only one labeled) which is located above and around each barrel 22. The c-shaped ridges 29 isolate the barrels 22 from the sector 26 except through the open section of their c-shape. As shown in FIG. 4, the open section of a c-shaped ridge 29 is aligned toward the low side of the inclined surface 27. The alignment of the open section in such a manner is important to combat electrolyte leakage from tilting. When the battery is tilted post side up, the electrolyte will be trapped by the closed section of the c-shaped ridge 29. When the battery is tilted post side down, the electrolyte will be trapped by the partition wall 32 adjacent to the open section and will eventually drain back into the cell.

Adjacent to the open section of the c-shaped ridge 29, a flat portion 30 is provided on the inclined surface 27. The flat portion 30 allows the electrolyte to drain more easily into the barrel 22 once any electrolyte which escaped into sector 26 reaches the open section of the c-shaped ridge 29. As shown in FIG. 5, the height of the c-shaped ridge 29 is equal to the height of the walls 32 which partition the primary cover 20 into the sectors 26a–f.

The primary cover 20 also has formed thereon two circular ridges 31a and 31f which define receptacles 33a and 33f. These will be described hereafter.

The secondary cover 40 includes six pairs of tubular splash guards, coaxially arranged outer tubular splash guards 42a–f and inner tubular splash guards 43a–f. For simplicity, only one pair of tubular splash guards is labeled in FIG. 4. When the secondary cover 40 is attached to the primary cover 20, these six pairs of splash guards extend into the six barrels 22a–f of the primary cover 20.

The outer diameter of the outer guard 42 is substantially equal to the diameter the barrel 22 so that when inserted, a tight seal exists between the outer surface of the outer guard 42 and the inner surface of the barrel 22. The outer guard 42 and the inner guard 43 are of the same length. The extension of these splash guards into the barrel 22 ends near the line indicated by arrow 51. The length of the tubular splash guards 42, 43 is critical because splash guards which are too long tend to create pumping action on the electrolyte contained in the cells which would force electrolyte into the covers. Splash guards which are too short do not prevent splashing satisfactorily.

The outer tubular splash guards 42a–f have slots 44a–f formed through their surfaces. Explosive gases evolved in the cells escape through these slots. The preferred embodiment has four slots for each outer tubular splash guard 42. The slots are formed symmetrically and run from the lower tip all the way to the top where the outer tubular splash guard 42 meets the lower surface of the secondary cover 40. The slots are tapered slightly from bottom to top, such that they are wider at the bottom end.

Each inner tubular splash guard 43 is aligned coaxially with a respective outer tubular splash guard 42 and defines an inner chamber 45 at its center. The only opening into the inner chamber 45 is through its bottom opening, so any evolved gases and electrolyte driven into the inner chamber 45 are returned to the cells through the bottom opening of the inner chamber 45.

The tubular splash guards 42, 43 operate to knock electrolytes back into the cells when the battery is being vibrated. The slots 44 are an important feature of the present invention, because they allow adequate release of the gases evolved in the cells. It is preferred that the slots 44 extend along the whole length of the outer guard 42, because the desired amount of gaseous communication through the slots 44 is achieved above the barrel 22 in the region encompassed by c-shaped ridge 29, the width of which is large enough to permit gaseous communication with the annular region between the inner and outer tubular members.

The secondary cover 40 also has a plurality of baffles which generally correspond to the plurality of baffles arranged on the primary cover 20. When the secondary cover 40 is attached to the primary cover 20, and the baffles on the primary cover are joined to the baffles on the secondary cover, a plurality of openings emerge through the baffles. These openings define passageways through which evolved gases released from the cells of the battery may escape.

The secondary cover 40 has o-shaped ridges 46a–f (only one labeled) which are aligned to correspond with the c-shaped ridges 29a–f of the primary cover 20. The joining of the o-shaped ridge 46 with the c-shaped ridge 29 creates a cylindrical barrier which is sealed on one side to the primary cover and on the other side to the secondary cover. The only break or opening through this cylindrical barrier is through the open section of c-shaped ridge 29.

The secondary cover 40 further includes a plurality of partition walls 47 which correspond to the partition walls 32 on the primary cover 20. The joining of the walls 47 with the walls 32 creates a plurality of compartments, whose wall boundaries define a rectangular shape. The only openings which allow gaseous communication between these compartments are through breaks 48 provided in the walls 47 of the secondary cover 40. The breaks 48 are positioned adjacent to a wall side which faces the open section of the c-shaped ridge 29. The positioning of the breaks 48 in such a manner is important to combat electrolyte leakage from tilting. When the battery is tilted post side up, electrolytes will be trapped at the far end (the end which is farther from the center axis of the battery), because there are no breaks in the partitions of the compartment at this end. When the battery is tilted post side down, electrolytes could flow over partition wall 32 through the break 48 provided on the secondary cover 20, but before this happens, tests conducted have shown that most, if not all, of the electrolyte will drain back into the cell.

External ports 70a, 70f are also provided on the secondary cover 40. Each external port 70 is in gaseous communication with a corresponding cylindrical conduit 71, which is surrounded by a partially open circular ridge 72 formed on the secondary cover. The partially open circular ridge 72 is aligned to be opposite to the circular ridge 31, such that when the two are joined, the opening through the partially open circular ridge 72 defines the sole passageway for gas.

The cylindrical conduit 71 is received in the receptacle 33 of the primary cover 20. The diameter of the cylindrical conduit 71 is less than that of the receptacle 33 and when received within the receptacle 33, the cylindrical conduit 71 does not extend to the bottom of the receptacle 33. In other words, gaps remain in the annular region between cylindrical conduit 71 and the receptacle 33 and between the bottom of the receptacle 33 and the axial end of cylindrical conduit 71.

In the preferred embodiment, bosses 34 are provided atop the bottom surface of the receptacle 33 (see FIG. 5). A porous plate 35 (only shown in FIG. 5) is inserted into the receptacle 33 atop the bosses 34 before the cylindrical conduit 71 of the secondary cover is received into the receptacle 33. The bosses 34 prevent the submersion of the porous plate 35 under the rare conditions where electrolytes have escaped into receptacle 33.

The evolved gases from the cells of the battery reach the external ports 70a, 70f in the following manner. First, gases are evolved in the respective cells as a result of charge and discharge reaction taking place therein. Second, these gases travel upwards in the annular region between the outer guard 42 and the inner guard 43, until they escape through the slots 44 into the cylindrical chamber defined by the joining of c-shaped ridge 29 and the o-shaped ridge 46. The gases then travel through the open section in the c-shaped ridge 29 into the rectangular shaped compartment. From there, they escape through the break 48 in the partition walls 47, until they reach the rectangular shaped compartment corresponding to one of the end sectors, either 26a or 26f. The gases then enter the annular region between the receptacle 33 and the cylindrical conduit 71 through the partially open section of the partially open circular ridge 72. At this point, the gases pass through the porous plate 35, into the center region of the cylindrical conduit 71 and out the external port 70. The porous plate 35 functions as a final device for preventing electrolyte from reaching the external port 70, if any electrolyte has traveled the just described circuitous route to reach the porous plate 35.

FIG. 7 is a perspective view of a venting system according to a second embodiment of the present invention. In the second embodiment, the posts 60, 65 of the battery are aligned along the centerline of the battery. The structural elements of the primary cover 20 and the secondary cover 40 are identical to that of the first embodiment. The only differences are in the dimensions, e.g. lengths of the partition walls 32, 47 and the length of the secondary cover 40.

Using the above described embodiments, venting of evolved gases and prevention of electrolyte leakage are achieved favorably. The venting of the gases is achieved through the passageways described above. The prevention of electrolyte leakage is achieved in the following manner.

First, the coaxial splash guards operate to suppress electrolyte leakage into the cylindrical chamber which is formed when the c-shaped ridge 29 and the o-shaped ridge 46 are joined together. If electrolyte still leaks into this cylindrical chamber and into the sector 26 through the open section of the c-shaped ridge, the electrolyte will not enter an adjacent rectangular shaped compartment unless it has accumulated sufficiently to flow over the partition walls 32 through the break 48. Otherwise, gravity acting on the electrolyte through the inclined surface 27 will force the electrolyte toward the open section of the c-shaped ridge 29 to be drained into the barrel 22. Further, even if electrolyte reaches the end sectors 26a, 26f, it must accumulate sufficiently at the end sectors 26a, 26f, so as to reach a level higher than the ridge height of the circular ridge 31 in order for the electrolyte to leak into the receptacle 33 through the partially open section of the partially open circular ridge 72. Leakage of electrolyte is further prevented by the porous plate 35 which is effective against electrolyte leakage as long as the porous plate 35 is not completely submerged in electrolyte. Considering that only a minute, negligible amount of electrolyte, if any, is expected to reach the receptacle 33, the porous plate 35 should be an effective final barrier against most, if not all, electrolyte leakage.

While particular embodiments according to the invention have been illustrated and described above, it will be clear that the invention can take a variety of forms and embodiments within the scope of the appended claims.

We claim:

1. An electrolyte venting system comprising:
   a casing defining an electrolyte containing cell;
   a primary cover mounted on said casing, said primary cover having a barrel corresponding to said electrolyte containing cell; and
   a secondary cover mounted on said primary cover, said secondary cover having coaxially arranged inner and outer tubular elements extending from a surface thereof, said inner tubular element having a diameter smaller than an inner diameter of said outer tubular element said tubular elements being inserted in said barrel of said primary cover, said outer tubular element having a plurality of slots formed therethrough;
   wherein said primary and secondary covers define a chamber disposed around said outer tubular element and in communication with said plurality of slots, said chamber being in fluid communication with an external port, wherein gases which are generated in said electrolyte containing cell pass from said cell through said barrel and between said inner and outer tubular elements then radially outwardly through said slots in said outer tubular element into said chamber and out of said chamber through said external port.

2. An electrolyte venting system as recited in claim 1, wherein said slots originate at an end of said outer tubular element and taper off with decreasing width in an axial direction away from said end.

3. An electrolyte venting system as recited in claim 2, wherein said slots extend from said end of the outer tubular element to said surface of the secondary cover.

4. An electrolyte venting system as recited in claim 3, wherein said slots are symmetric with respect to a plane including a center longitudinal axis of said tubular elements.

5. An electrolyte venting system as recited in claim 1, further comprising a plurality of baffles around which gas is communicated between said external port and said cell.

6. An electrolyte venting system as recited in claim 1, wherein said primary cover has a c-shaped ridge surrounding said barrel and said secondary cover has an o-shaped ridge corresponding to said c-shaped ridge such that gaseous communication between said barrel and said external port is achieved through an open section in said c-shaped ridge.

7. A battery cover for a battery casing defining a plurality of electrolyte containing cells, comprising:
   a primary cover having a plurality of barrels arranged along a longitudinal axis thereof; and
   a secondary cover having a plurality of tubular elements extending from a surface thereof, said tubular elements being insertable in said barrels of said primary cover, each of said tubular elements having an inner tubular member and an outer tubular member, said outer tubular member having a plurality of slots formed therethrough;
   wherein said secondary cover includes an external port in gaseous communication with said barrels of said primary cover;
   said primary cover has a first ridge portion surrounding each of said barrels and said secondary cover has a second ridge portion corresponding to each of said first ridge portions such that gaseous communication between each of said barrels and said external port is achieved through an open section in at least one of said first and second ridge portions;
   said primary cover and said secondary covers being provided with additional ridges for partitioning said barrels from each other to form a plurality of compartments, wherein the longitudinal axis of the barrels is offset from the center of each compartment thereby defining a short side and a long side in each compartment;
   wherein said open section in at least one of said first and second ridge portions is located adjacent to and faces the short side of each compartment; and
   wherein the additional ridges of said secondary cover have cutouts formed adjacent said short side of said compartments such that gas can communicate among said barrels and said external port through said cutouts.

8. A battery cover as recited in claim 7, wherein said slots of said outer tubular member originate at an end of said outer tubular member and extend with decreasing width in an axial direction to the surface of said secondary cover.

9. A battery cover as recited in claim 8, wherein said slots are symmetric with respect to a plane including a center longitudinal axis of said outer tubular member.

10. A battery cover as recited in claim 6, wherein a bottom surface of said long side of each compartment is inclined with respect to said short side.

11. A battery cover as recited in claim 7, wherein said barrels of said primary cover are arranged along a centerline of said battery casing.

12. A battery cover as recited in claim 7, wherein said primary cover includes a pair of terminal bushings for receiving electrodes, said terminal bushings being arranged along a centerline of said battery casing.

13. A battery cover for a battery casing defining a plurality of electrolyte containing cells, comprising:
   a primary cover having a plurality of barrels arranged along a longitudinal axis thereof; and
   a secondary cover having a plurality of tubular elements extending from a surface thereof, said tubular elements being insertable in said barrels of said primary cover, each of said tubular elements having an inner tubular member and an outer tubular member, said outer tubular member having a plurality of slots formed therethrough;
   wherein said secondary cover includes an external port in gaseous communication with said barrels of said primary cover;
   said secondary cover further including a cylindrical conduit connected to said external port and a partially open circular ridge which surrounds said conduit and
   said primary cover further including a cylindrical receptacle for receiving said conduit therein and a circular ridge which surrounds said receptacle and coincides with said circular ridge of the secondary cover, such that gas can pass through an opening of said partially open circular ridge to said receptacle and then through said conduit to said external port.

14. A battery cover as recited in claim 13, further comprising a projecting surface on a bottom surface of said receptacle and a porous plate received in said receptacle atop said projecting surface, such that gas can pass through the opening of said partially open circular ridge to said receptacle and then through said porous plate to said conduit and said external port.

* * * * *